US005613697A

United States Patent [19]

Johnson

[11] Patent Number: 5,613,697

[45] Date of Patent: Mar. 25, 1997

[54] ELEVATABLE WHEELCHAIR

[76] Inventor: David D. Johnson, Rte. 1, Box 788-B, Hortense, Ga. 31543

[21] Appl. No.: 344,580

[22] Filed: Nov. 18, 1994

[51] Int. Cl.[6] .......... B62M 1/14

[52] U.S. Cl. .......... 280/250.1; 280/304.1; 280/43.23

[58] Field of Search .......... 280/249, 250.1, 280/304.1, 43.23

[56] References Cited

U.S. PATENT DOCUMENTS

| | | | |
|---|---|---|---|
| 949,331 | 2/1910 | Scholle | 280/43.23 |
| 1,219,834 | 3/1917 | Meeks . | |
| 3,002,760 | 10/1961 | Lee | 280/43.23 |
| 3,215,469 | 11/1965 | Wainsley . | |
| 4,274,650 | 6/1981 | Gilley | 280/249 X |
| 4,392,662 | 7/1983 | Hoglinger | 280/43.23 |
| 4,886,288 | 12/1989 | Dysarz | 280/250.1 |
| 5,076,390 | 12/1991 | Haskins | 280/250.1 |

FOREIGN PATENT DOCUMENTS

| | | | |
|---|---|---|---|
| 0328221 | 8/1989 | European Pat. Off. | 280/250.1 |
| 3929289 | 2/1991 | Germany | 280/250.1 |
| 0203486 | 8/1988 | Japan | 280/43.23 |
| 0563308 | 6/1977 | U.S.S.R. | 280/43.23 |
| 922175 | 3/1963 | United Kingdom . | |

*Primary Examiner*—Brian L. Johnson
*Assistant Examiner*—Michael Mar
*Attorney, Agent, or Firm*—Peter A. Borsari

[57] ABSTRACT

An elevatable wheelchair having a hydraulic system for elevating and lowering the wheelchair and a drive gear arrangement for motivating the wheelchair while the wheelchair is in an elevated position. The hydraulic system comprises four hydraulic legs, each corresponding to and coupled to one of a pair of front wheels or to one of a pair of auxiliary rear wheels. When hydraulic fluid is introduced to the four hydraulic legs, the hydraulic legs begin to extend, thereby elevating the wheelchair. The hydraulic system also comprises a pair of flow equalizers to ensure a uniform flow of hydraulic fluid to each hydraulic leg, thereby enabling each hydraulic leg to extend at the same rate. The elevatable wheelchair also comprises a drive gear arrangement which coacts with the main wheels of the wheelchair in order to transfer motion to the auxiliary rear wheels, thereby enabling the wheelchair user to motivate the wheelchair while in the elevated position by engaging the hand rails on the main wheels. The elevatable wheelchair provides an individual confined to the wheelchair with the ability not only to elevate the wheelchair to a desired height for reaching shelves, countertops and similar higher surfaces but also to maneuver the wheelchair while in this elevated position.

15 Claims, 3 Drawing Sheets

ELEVATABLE WHEELCHAIR

FIELD OF INVENTION

The present invention relates to a wheelchair comprising a hydraulic system for elevating and lowering the wheelchair and a drive gear arrangement for maneuvering or otherwise motivating the wheelchair while in the elevated position. More particularly, the present wheelchair enables an individual confined to the wheelchair to selectively raise and lower the wheelchair to a desired height for reaching shelves, countertops and similar higher surfaces and further provides the individual with the freedom to move about in the wheelchair while in its elevated position.

BACKGROUND OF THE INVENTION

The wheelchair is a valuable device for assisting disabled individuals in transporting themselves from one location to another. The most common type of wheelchair in use today is that fashioned from two substantially rigid side frames each including a large main wheel and a smaller front wheel, and joined together by a collapsible brace, a canvas seat and backrest. This wheelchair type can be easily folded for storage, such as in the trunk of an automobile. The conventional wheelchair is designed with a low center of gravity so as to enhance the stability and safety of the wheelchair. As a result, such a wheelchair is provided with a relatively low level seat position, generally lower than that of a typical chair. While such a design enables disabled individuals to more efficiently access and exit the wheelchair, move about their living and working space, sit at a table or desk and the like, this design has inherent disadvantages.

One significant drawback associated with the standard wheelchair described above is that the reach of the individual user of the wheelchair is severely limited. Countertops, stovetops, sinks and washbasins, cupboards, workbenches, grocery shelves and other high surfaces generally are either inaccessible to one confined in a wheelchair or are only partially accessible. For instance, a disabled individual using a wheelchair may be able to cook on a stove, but the top of the stove is at the eye level of that individual. The inability of the wheelchair user to attain a sufficient height also poses other problems. For example, in conversation, the wheelchair user is placed in the uncomfortable position of always having to look up to persons who are standing, rather than being able to engage standing persons at eye level.

Numerous attempts have been made in the prior art to elevate or raise the person sitting in the wheelchair. For example, wheelchairs with means to elevate the seat portion, as shown in U.S. Pat. Nos. 1,219,834, 2,578,382, 2,982,336 and 3,215,469 have been proposed. However, with such designs, the ability to collapse and fold the wheelchair for easy storage has been abandoned.

British Patent 922,175 shows a collapsible wheelchair having a seat portion which is elevated by a hydraulic ram. However, the seat frame work and hydraulic ram must be removed prior to folding the wheelchair.

U.S. Pat. No. 3,985,389 to Bonfield discloses another elevating means for raising an entire wheelchair, said means comprising a pair of extendable frameworks which are secured to the sideframes of a wheelchair and a hydraulically actuated lifting means. In operation, the hydraulic lifting means causes the pair of frameworks to extend downwardly and engage the ground while elevating the entire wheelchair. As the frameworks are secured to the sideframes, the modified wheelchair remains collapsible and foldable for storage.

U.S. Pat. No. 4,886,288 to Dysarz provides a wheelchair which can be elevated on four legs that extend from beneath the wheelchair to a position outside of the wheel base of the wheelchair. The elevating means is accomplished by the use of hydraulic or pneumatic pressure reacting on the cylinders that form the four legs.

While much progress has been made in developing wheelchairs which can be elevated by a person confined to a wheelchair, such wheelchairs still do not satisfy the varied and special needs of the wheelchair user. For example, although such devices assist the wheelchair user in reaching certain items, the wheelchair must be lowered to its pre-elevated state when it is desired to move to a different location. Raising and lowering the wheelchair can be especially cumbersome on the user while performing certain everyday tasks, such as grocery shopping, moving about a kitchen in order to prepare a meal, and the like. For example, the wheelchair user who is grocery shopping must elevate the wheelchair to reach an item on a high shelf, lower the wheelchair to its normal position, move down the grocery aisle and once again elevate the wheelchair to reach an item on a high shelf. This continuous raising and lowering of the wheelchair in order to complete such an elementary chore, is not only time-consuming, but also is discouraging to the wheelchair user attempting to achieve a level of independence.

To date, there have not been any great strides in developing a wheelchair which can be elevated and which can be safely and efficiently motivated by the user while in its elevated position. U.S. Pat. No. 4,193,147 to Fischer provides a cantilevered lifting and transporting device which may be automatically or manually converted from a chair to a stretcher or vice versa. Although the device is raised and lowered by a hand-cranked screw and nut combination, it is more akin to a hospital or nursing home transport vehicle than a conventional wheelchair which has elevating means. Indeed, the Fischer device is not collapsible and, as shown, cannot be motivated by the user.

U.S. Pat. No. 4,477,117 to Higgs offers a wheelchair having means to elevate the seat and back portion relative to the main frames of the wheelchair. Higgs provides a specially constructed side frame having an elevating device, such as a "Saginaw" jacked screw, such that each side frame is elevated relative to the main frames which carry the wheels of the wheelchair. In this manner, the side frames and the seat and back portions raise together as a unit, along with the cross struts to maintain the stability of the wheelchair. However, the arm rests and foot rest are not elevated and have to be manually adjusted once the wheelchair is elevated. As the wheels remain at ground level, it appears possible that the wheelchair could be motivated while elevated, although the stability of the elevated wheelchair may be an impediment to free mobility. Further, it is unclear and doubtful whether the individual confined to the wheelchair could easily motivate a manual wheelchair given the fact that in Higgs, it is the individual who has been elevated up and away from the main driving wheel. Moreover, while Higgs describes the wheelchair as being foldable, he acknowledges that with electrically driven elevating devices, the battery may have to be removed prior to collapsing the wheelchair.

Despite the teachings of the prior art, a need still exists for a wheelchair which can be elevated by the individual confined in the wheelchair to a desired height and which can be mobilized by the wheelchair user while in a raised position user in a manner which is safe and practical.

SUMMARY OF THE INVENTION

Accordingly, it is an object of the present invention to provide a wheelchair comprising elevating means which can be activated by the individual confined in the wheelchair.

It is another object of the present invention to provide a wheelchair having elevating means and which can be motivated in the elevated state by the individual confined in the wheelchair.

It is still another object of the present invention to provide a wheelchair having elevating means which can be motivated in the elevated state by use of the main wheel and hand rail arrangement.

It is a further object of the present invention to provide a wheelchair which may be elevated by means of a hydraulic system.

It is an additional object of the present invention to provide a wheelchair having hydraulic elevating means wherein the wheelchair is raised in a safe and uniform manner.

It is yet another object of the present invention to provide a wheelchair which can be motivated in the elevated state by a drive gear arrangement which interacts with the main wheel and hand rail.

It is still a further object of the present invention to provide a wheelchair which will enable an individual confined thereto to be more independent in the home and the workplace.

It is still another object of the present invention to provide an individual confined to a wheelchair with the ability to perform everyday tasks in the home, such as cooking, cleaning, grocery shopping and the like.

It is an additional object of the present invention to provide an individual confined to a wheelchair with the ability to perform general office tasks, such as filing, retrieving books from high shelves and the like.

Additional objects, advantages and novel features of the invention will be set forth in part in the description which follows, and in part will become apparent to those skilled in the art upon examination of the following specification or may be learned by practice of this invention.

These and other objects of the invention, as embodied and broadly described herein, are achieved by providing a wheelchair comprising a hydraulic system for elevating the wheelchair and a drive gear arrangement for maneuvering or otherwise motivating the wheelchair while in an elevated position. The elevating means of the present invention provides an individual confined to the wheelchair with the ability to selectively raise the wheelchair to a desired height for reaching shelves, countertops and similar higher surfaces and thereafter lower the wheelchair to its normal state. The motivating means of the present invention enables the wheelchair user to move about in the wheelchair in its raised position by engaging the hand rails on the main wheels of the wheelchair in the same manner as with a conventional wheelchair.

BRIEF DESCRIPTION OF THE DRAWINGS

The present invention will be better understood with reference to the appended drawing sheets, wherein.

DETAILED DESCRIPTION

The present invention relates to a wheelchair which can be selectively elevated by the individual confined to the wheelchair to the desired height of a standing person, thereby allowing the person to reach higher shelves, countertops and the like. The wheel chair of the present invention also provides means to enable the individual to move about in the wheelchair while in its elevated state.

Figure 1:
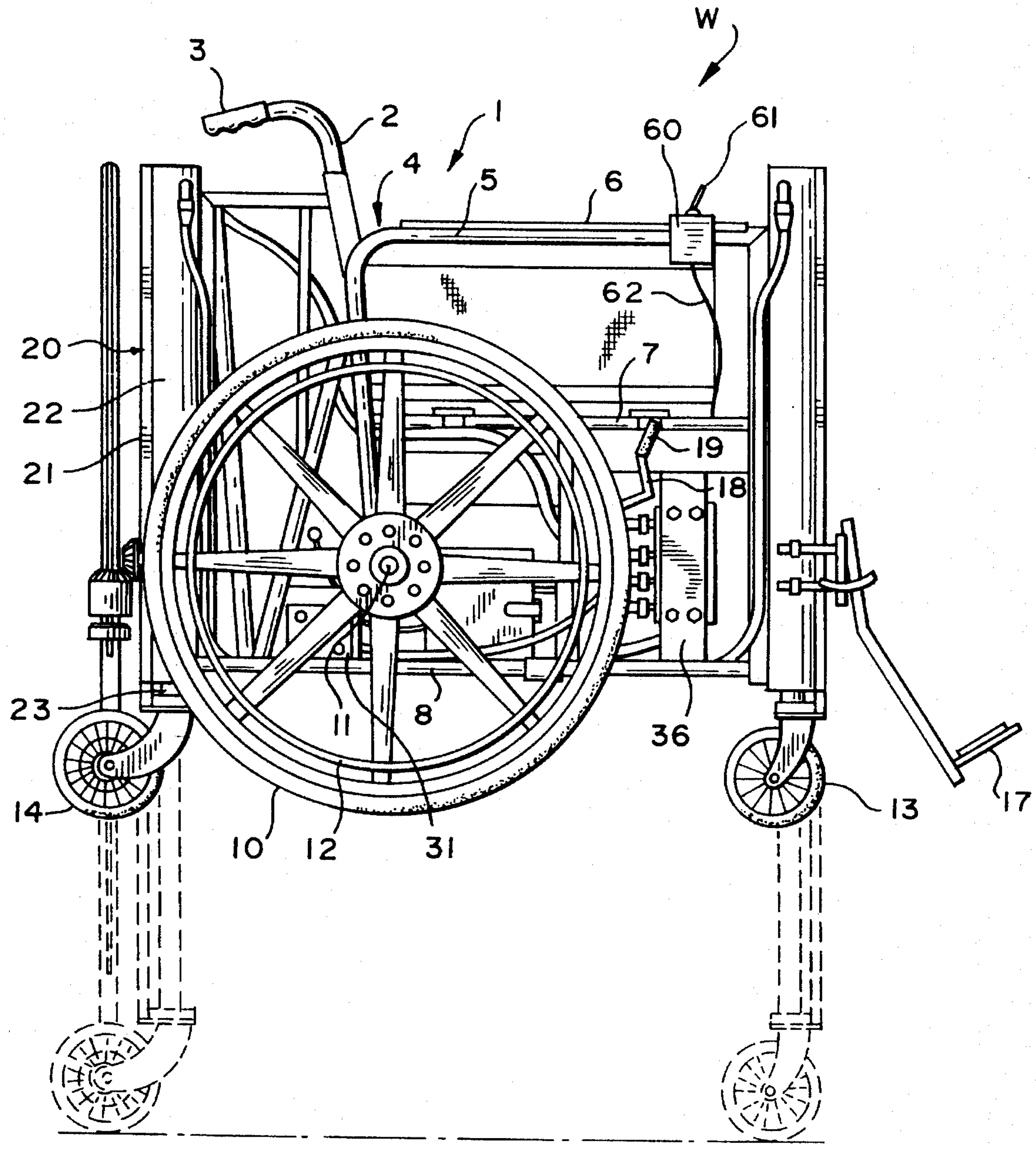
FIG. 1 is a side view of the wheelchair of the present invention, illustrating the locating of hydraulic elevating means and drive gear arrangement.

Referring to FIG. 1, the wheelchair of the present invention, generally indicated at W, comprises a framework on each side of the wheelchair. To facilitate discussion, this description primarily will refer to only one side of the wheelchair.

Figure 2:
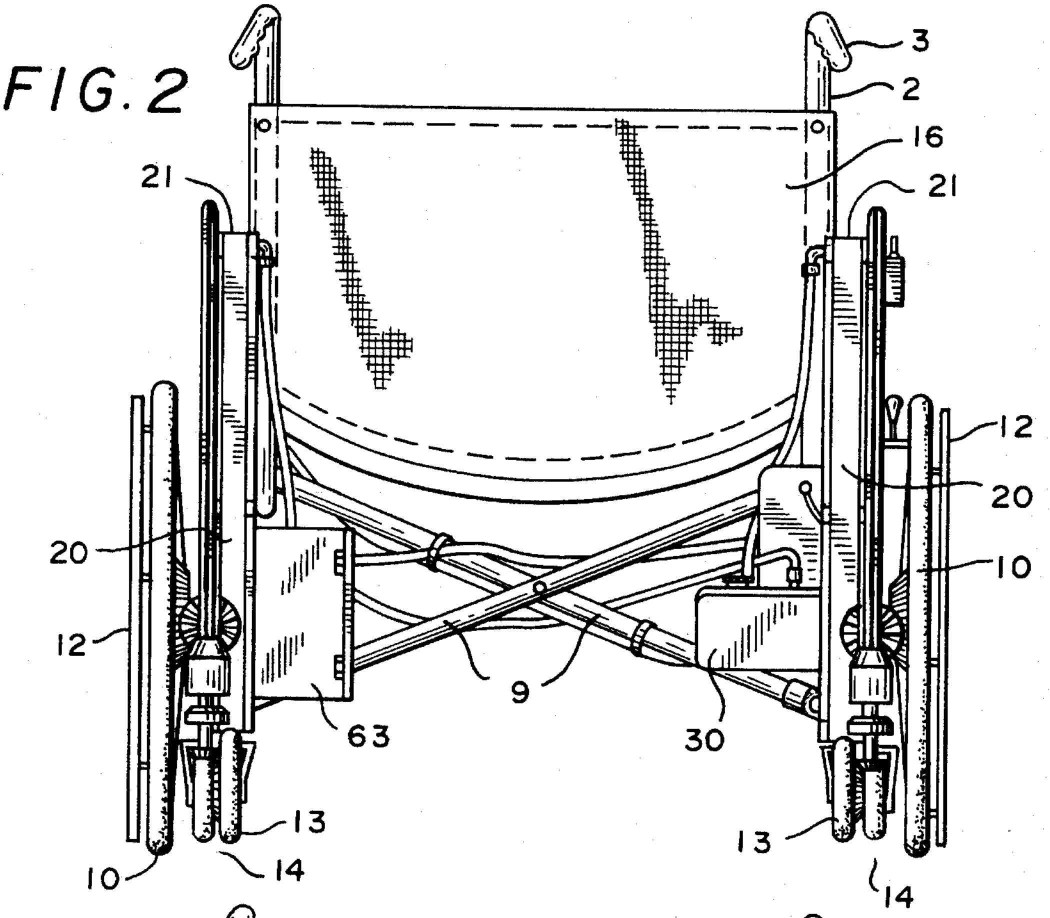
FIG. 2 is a rear view of the wheelchair of the present invention.
Figure 3:
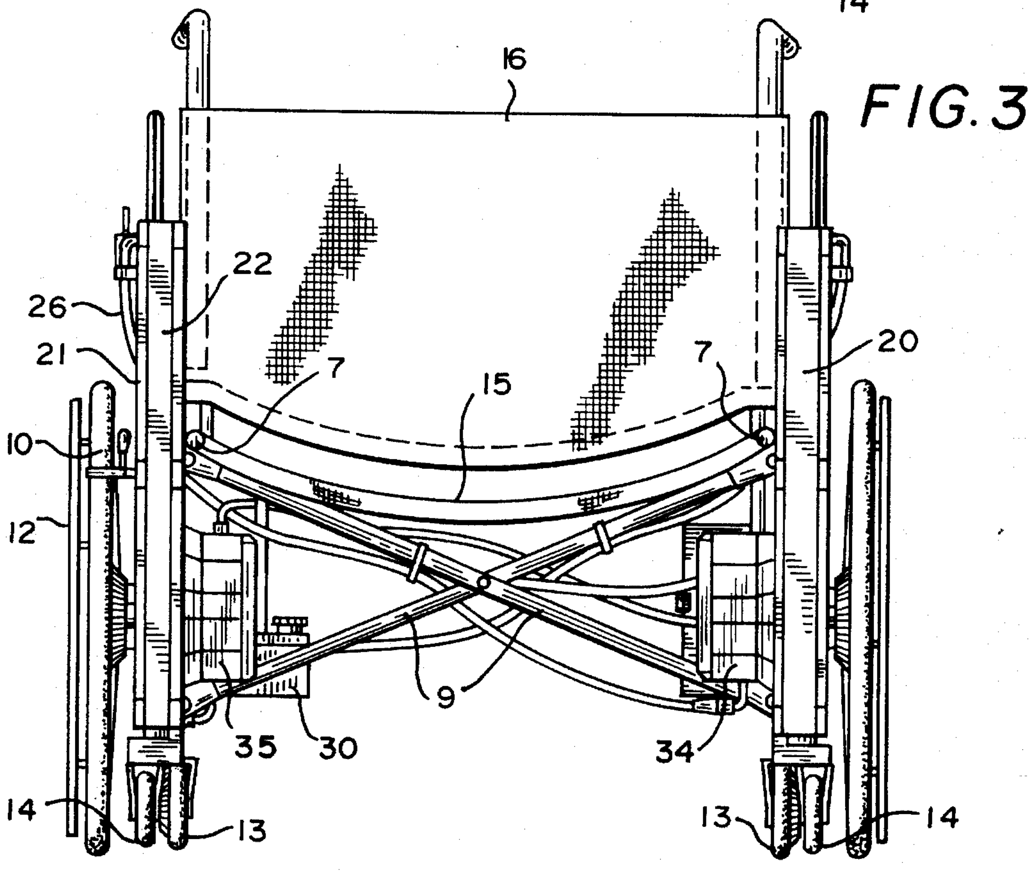
FIG. 3 is a frontal view of the wheelchair of the present invention.

The framework generally indicated at 1, comprises a rearward upright bar 2 terminating into a hand grip 3 at the upper end thereof and a side frame 4 having an upper leg 5 which supports a tray, arm rest or the like 6, an upper horizontal cross bar 7 and a lower horizontal cross bar 8. The wheelchair also comprises a large main wheel 10 mounted for rotation on axis 11 and having hand rail 12, a front wheel 13 and an auxiliary rear wheel 14. The front wheel 13 and auxiliary rear wheel 14 generally are smaller in diameter than main wheel 10, and are typically about six inches in diameter. The auxiliary rear wheels typically are inoperable when the wheelchair is in the normal position (i.e. unelevated) and are disposed slightly above ground level, such as ¾" above the ground. As shown in FIGS. 2 and 3, each side frame is connected to the other side frame by means of foldable locking struts or braces 9, as well as by a canvas seat 15 which is supported by the upper horizontal cross bars 7 and a canvas back rest 16 which is supported between the upper ends of upright bars 2. The inventive wheelchair also comprises many of the standard features of a conventional wheelchair including, for example, an adjustable leg and foot support 17, a wheel brake 18 and a wheel brake handle 19.

The wheelchair of the present invention is provided with a hydraulic system which elevates or otherwise raises the wheelchair framework 1, including the main wheel 10, up to about an additional twenty inches (20"). The hydraulic system comprises four (4) individual piston-cylinder arrangements, hereinafter sometimes referred to as hydraulic legs, such that there is one hydraulic leg coupled to each of the front and auxiliary rear wheels. Tubular hosing connects each of the hydraulic legs to a flow equalizer which is connected to a hydraulic pump.

Figure 4:
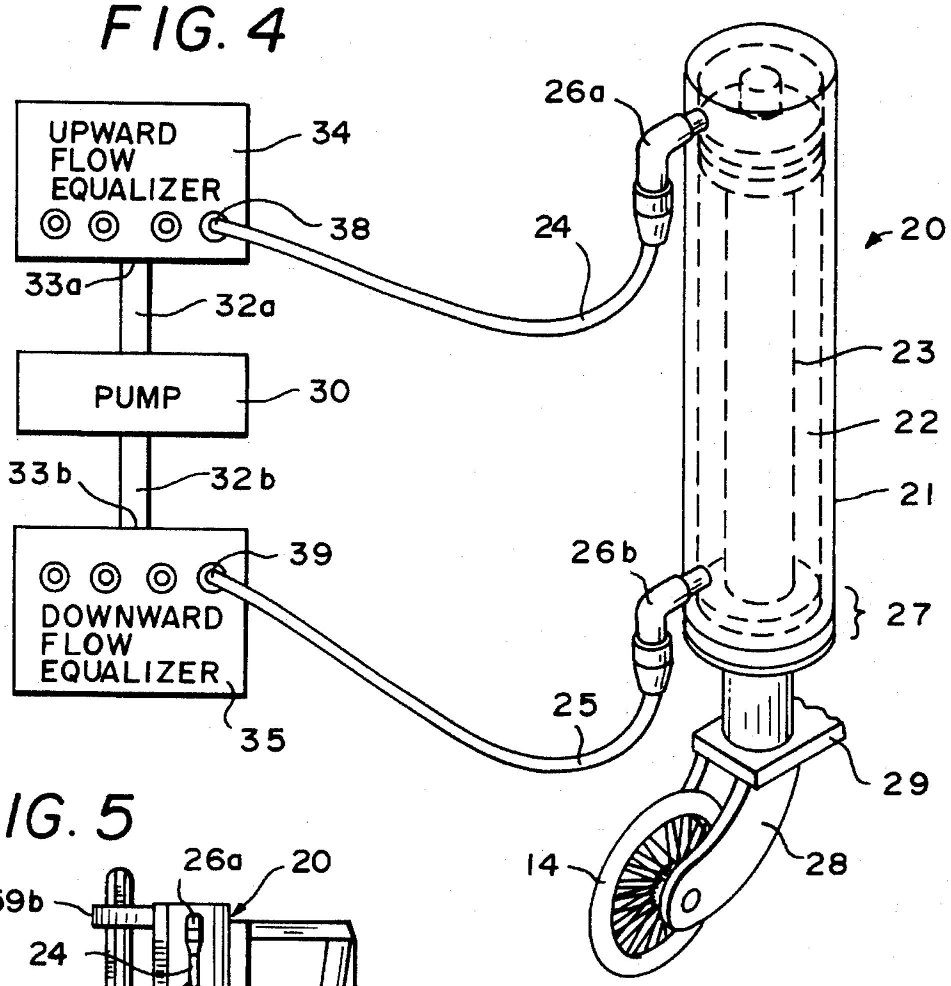
FIG. 4 is a schematic diagram of the hydraulic system of the present invention.

To facilitate discussion, the hydraulic system of the present invention will be described in terms of one hydraulic leg connected to one wheel. Referring to FIG. 4, which shows a schematic diagram for the hydraulic system of the present invention, the hydraulic system includes a hydraulic leg, generally designated 20, comprising a guide housing 21, a hydraulic cylinder 22 and a cylinder or piston rod 23. More specifically, the guide housing 21 is a stationary channel of metal or a similar tubular member which functions as a guide or slide for the cylinder 22 and is secured to lower horizontal cross bar 8 of the wheelchair framework 1 by means well known in the art. The cylinder or piston rod 23 passes through the hydraulic cylinder 22 which is disposed within the guide housing 21. The piston rod 23 is joined or otherwise attached to a castor or similar wheel bracket 28 through cylinder slide 29. The cylinder slide functions as a guide to hold and lock the wheel into position when the wheelchair is in an elevated position, thereby providing additional stability to the front wheels and auxiliary rear wheels when the wheelchair is elevated. In this manner, each auxiliary rear wheel 14 and each front wheel 13 is associated with a hydraulic leg 20. Flexible hydraulic hoses or tubes 24 and 25 convey hydraulic fluid to the hydraulic leg. More particularly, one end of a hydraulic hose 24 is connected to the upper or top portion of the cylinder 22 by means of a hydraulic weld fitting **26*a* and one end of a hydraulic hose 25 is connected to the lower or bottom portion of the cylinder 22 by means of hydraulic weld fitting 26*b*. The other ends of the hydraulic hoses 24 and 25 are connected to hydraulic pumping means as will be described below. Each hydraulic leg 20 is provided with a cylinder gland 27 as shown in FIG. 4**, to prevent hydraulic fluid from leaking or spilling from the cylinder.

The hydraulic system further comprises a hydraulic pump and reservoir unit 30 and flow dividers or flow equalizers 34 and 35. The flow equalizers ensure that a steady and uniform flow of hydraulic fluid is conveyed to each hydraulic leg. More particularly, flow equalizer 34 enables the hydraulic system to elevate each hydraulic leg at the same rate by transferring fluid to the upper portion of each cylinder with the same amount of pressure and may be referred to as the "upward flow equalizer". Flow equalizer 35 enables the hydraulic system to lower each hydraulic leg at the same rate by transferring fluid to the lower portion of each cylinder with the same amount of pressure and may be referred to as the "downward flow equalizer". The use of the upward and downward flow equalizers provides that the wheelchair will be elevated and lowered in a safe, even and uniform manner. As shown in FIG. 1, the hydraulic pump and reservoir unit 30 is secured to the framework 1 by mounting bracket 31; the flow equalizers 34 and 35 are secured to the framework 1 by mounting brackets 36.

Referring again to FIG. 4, flexible hydraulic tubes or hoses **32*a* and 32*b* connect the hydraulic pump and reservoir unit 30 to the flow equalizers 34 and 35 respectively for transferring fluid therebetween. Upward flow equalizer 34 is provided with four (4) individual outlets 38, such as screw fittings, such that hydraulic fluid can be uniformly transferred to each hydraulic cylinder 22 via hydraulic hose 24 as the wheelchair is elevated. Downward flow equalizer 35 is provided with four (4) individual outlets 39 such that hydraulic fluid can be transferred to each hydraulic cylinder 22 via hydraulic hose 25 as the wheelchair is lowered. More specifically, it can be seen that hydraulic fluid supplied via hydraulic hose 24 to hydraulic cylinder 22 will cause piston rod 23 to move downwardly in the cylinder 22 and subsequently elevate the wheelchair above the ground. Hydraulic fluid supplied via hydraulic hose 25 to the cylinder 22 will cause the piston rod 23** to move upwardly, thereby lowering the wheelchair.

The hydraulic system is activated by a toggle switch 61 mounted in switch housing 60 which is located on side frame 4, preferably near arm rest 6 as shown in FIG. 1. The toggle switch is connected by conventional wiring 62 to the hydraulic pump and reservoir unit 30. In operation, the wheelchair user need only push the toggle switch forward in order to elevate the wheelchair. When it is desired to lower wheelchair, the operator simply pulls the toggle switch in the opposite direction. When the toggle switch is released to the neutral position the raising or lowering of the wheelchair is paused. In this manner, the wheelchair user can selectively elevate and lower the height of the wheelchair. Preferably, the pump 30 is powered by a battery source 63, such as a twelve volt battery. Of course, when the wheelchair is electrically powered, there is no need for an independent battery source to power the pump. Rather the pump can be powered by the existing electric power source.

When the hydraulic elevating system is activated, the wheelchair framework 1, including the main wheel 10 begins to slowly and safely lift off the ground. As the wheelchair is lifted, the smaller auxiliary rear wheels 14, disposed slightly above ground level, contact the ground surface. The smaller front wheels remain at ground level. In this manner, all four smaller wheels are at ground level, while the wheelchair frameworks 1 and main wheels 10 are elevated by the four hydraulic legs connected to the four smaller wheels. The elevated wheelchair still can be mobilized in this raised state by the wheelchair user. Mobilization or motivation of the wheelchair by the user therein is accomplished by the drive gear mechanism of the present invention.

The main wheels 10 on the sides of the wheelchair are of the same type of large wheels one would expect to find on any conventional manual wheelchair and include the conventional hand rail on the outside of each main wheel. Generally, when the wheelchair is in its normal, unelevated state, the wheelchair user simply turns the hand rail which engages and rotates the main wheels. In this manner, the user can move about in the wheelchair independently. However, the inside of each of the main wheels has been adapted with a six-inch gear which rotates in conjunction with the drive gear arrangement of the present invention, which, in turn, drives the auxiliary rear wheels.

Figure 5:
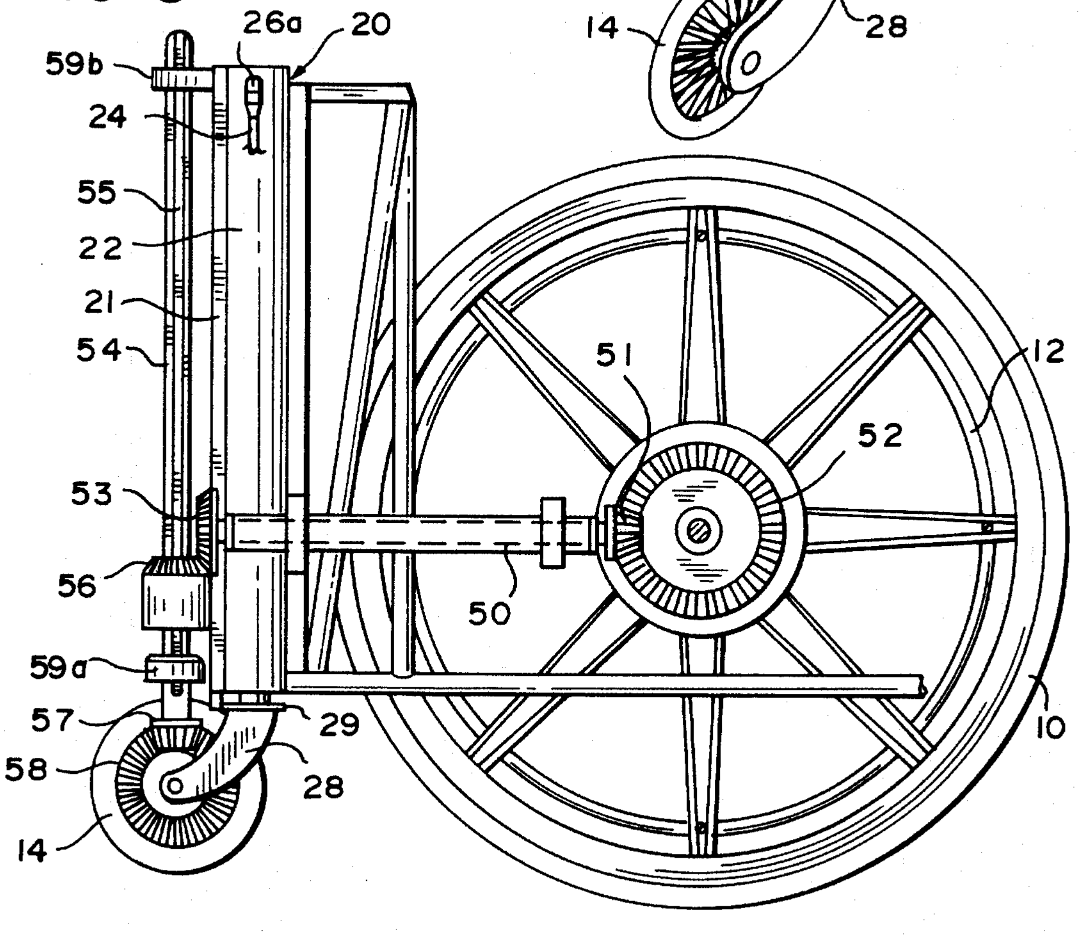
FIG. 5 shows the drive gear arrangement of the present invention.

More particularly, as shown in FIG. 5, the gear mechanism comprises a drive shaft 50, having a drive shaft gear 51 at one end thereof. Drive shaft gear 51, preferably a one inch gear, rotates in conjunction with a wheel drive gear 52 disposed on the inside of main wheel 10. A matching gear drive 53 is disposed in its own cradle at the opposite end of drive shaft 50, towards the rear of the wheelchair. Gear drive 53 is a gear assembled with the same matching gear as drive shaft gear 51. At the rear of the wheelchair is a gear driven rod 54 which provides movement from the large wheel to the auxiliary rear wheel. Disposed within rod 54 is a keyway shaft 55 which extends through a drive gear 56, preferably a two-inch gear. Drive gear 56 rotates in conjunction with matching gear drive 53. The gear driven rod 54 is connected to a matching gear 57 which rotates in conjunction with wheel drive gear 58, thereby driving the auxiliary rear wheels 14. A rod collar **59*a* may be affixed to rod 54 in order to prevent the rod from slipping or moving. A secondary collar 59*b* may be utilized to join and connect the upper portion of rod 54 with the hydraulic leg 20** in order to provide additional stability to the drive gear rod.

Although the description of the drive gear arrangement is related with respect to conventional manual wheelchairs, the drive gear arrangement of the present invention can be easily adapted to electric wheelchairs, wherein power to rotate the main wheels is provided by an electric source and not by the hand rails.

As shown and described above, the wheelchair of the present invention is equipped with hydraulic elevating means and a gear drive arrangement interacting with the main wheel of the wheelchair in order to enable the wheelchair user to motivate the wheelchair once it is elevated. Also contemplated within the scope of the present invention is the conversion or transformation of a conventional, existing wheelchair with elevating means, including, for example, hydraulic means, and the inventive gear drive arrangement.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A wheelchair comprising:

(a) a framework having a front end, a rear end and two side frames;

(b) a pair of ground engaging main wheels each having an inside face and each being rotatably mounted to an axis affixed to said framework for engaging a ground surface in a ground engaging position;

(c) a pair of front wheels and a pair of auxiliary rear wheels, each of said wheels being rotatably mounted to said framework;

(d) a hydraulic system fixedly attached to said framework, said hydraulic system being operatively configured to reversibly elevate said framework and said pair of main wheels from said ground engaging position to an elevated position, said framework being supported on said ground surface only by said front and rear wheels when in said elevated position;

(e) a drive gear arrangement rotatably arranged on said framework and connecting said pair of main wheels to said pair of auxiliary rear wheels, said drive gear arrangement being operatively configured to translate a rotation of said main wheels by a user of said wheelchair into a motive force for rotating said pair of auxiliary rear wheels when said framework is elevated to said elevated position.

2. The wheelchair in accordance with claim 1, wherein said drive gear arrangement comprises two main wheel drive gears corresponding to said pair of main wheels, each main wheel drive gears being affixed to said inside face of said corresponding main wheel, said two main wheel drive gears engaging said drive gear arrangement and being rotatable therewith to translate rotary motion of said pair of main wheels to said drive gear arrangement.

3. The wheelchair in accordance with claim 2, wherein said drive gear arrangement further comprises two drive shafts corresponding to said two main wheel drive gears, each drive shaft comprising:

(a) a first end and a second end;

(b) a drive shaft gear disposed at said first end of said of drive shaft and engaging said corresponding wheel drive gear and rotating in conjunction therewith; and (c) a drive gear mechanism attached to said second end and being rotatable in conjunction with said drive shaft gear to drive said pair of auxiliary wheels.

4. The wheelchair in accordance with claim 3, wherein said drive gear mechanism further comprises:

(a) a matching gear drive disposed at said second end of said drive shaft;

(b) a drive gear, said drive gear engaging and being rotatable with said matching gear drive;

(c) a gear driven rod having a keyway shaft disposed therein;

(d) an auxiliary rear wheel matching gear drive through which said gear drive rod extends; and (e) an auxiliary rear wheel drive gear, said auxiliary rear wheel drive gear engaging and being rotatable with said auxiliary rear wheel matching gear drive to impart rotational motion to said pair of rear auxiliary wheels.

5. The wheelchair in accordance with claim 4, wherein a rod collar is affixed to said gear driven rod in order to prevent said rod from moving or slipping.

6. The wheelchair in accordance with claim 1, wherein said hydraulic system comprises a hydraulic pump and reservoir unit, four hydraulic legs, each of said legs having an upper portion and a lower portion, and means to activate said hydraulic system.

7. A wheelchair in accordance with claim 6, wherein each of said plurality of hydraulic legs comprises:

(a) a hydraulic cylinder;

(b) a piston rod, said piston rod extending through said hydraulic cylinder;

(c) a guide housing, said hydraulic cylinder being disposed within said guide housing; and (d) a cylinder slide, said cylinder slide connecting each of said plurality of hydraulic legs to one of said pair of front wheels or to one of said pair of auxiliary rear wheels.

8. The wheelchair in accordance with claim 6, wherein said hydraulic system further comprises an upward flow equalizer and a downward flow equalizer.

9. The wheelchair in accordance with claim 8, wherein each of said upward flow equalizer and said downward flow equalizer comprises an outlet for communication with said hydraulic pump and reservoir unit and four identical outlets for communication with said four hydraulic legs.

10. The wheelchair in accordance with claim 9, wherein a first plurality of hydraulic hoses connects said lower portion of each of said four hydraulic legs with said downward flow equalizer and a second plurality of hydraulic hoses connects said upper portion of each of said four hydraulic legs to said upward flow equalizer.

11. A wheelchair in accordance with claim 10, wherein said activating means comprises a toggle switch having a first position and a second position, said toggle switch being connected to said hydraulic pump and reservoir unit and being operatively configured such that when said toggle switch is in said first position, said wheelchair is elevated and when said toggle switch is in said second position, said wheelchair is lowered.

12. The wheelchair in accordance with claim 8, wherein said upward flow equalizer and said downward flow equalizer deliver a steady and uniform flow of hydraulic fluid to each of said four hydraulic legs.

13. A wheelchair comprising:

(a) a framework having a front end, a rear end and two side frames;

(b) a pair of ground engaging main wheels each having an inside face and each being rotatably mounted to an axis affixed to said framework for engaging a ground surface in a ground engaging position;

(c) a pair of front wheels and a pair of auxiliary rear wheels, each of said wheels being rotatably mounted to said framework;

(d) a hydraulic system fixedly attached to said framework, said hydraulic system being operatively configured to reversibly elevate said framework and said main wheels from said ground engaging position to an elevated position, said framework being supported on said ground surface only by said front and rear wheels when in said elevated position;

(e) a drive gear arrangement rotatably arranged on said framework and connecting said pair of main wheels to said pair of auxiliary rear wheels, said drive gear arrangement being operatively configured to translate a rotation of said main wheels by a user of said wheelchair into a motive force for rotating said pair of auxiliary rear wheels when said framework is elevated to said elevated position, said drive gear arrangement comprising:

(1) two main wheel drive gears corresponding to said pair of main wheels, each of said main wheel drive gears being affixed to said inside face of said corresponding main wheel, said two main wheel drive gears engaging said drive gear arrangement and being rotatable therewith to translate rotary motion of said pair of large main wheels to said drive gear arrangement, (2) two drive shafts corresponding to said two main wheel drive gears, each drive shaft comprising (a) a first end and a second end; (b) a drive shaft gear disposed at said first end of said of drive shaft and engaging said corresponding wheel drive gear and rotating in conjunction therewith; and (c) a drive gear mechanism attached to said second end and being rotatable in conjunction with said drive shaft gear to drive said pair of auxiliary wheels.

14. The wheelchair in accordance with claim 13, said drive gear mechanism comprising:

(a) a matching gear drive disposed at said second end of said drive shaft;

(b) a drive gear, said drive gear engaging and being rotatable with said matching gear drive;

(c) a gear driven rod having a keyway shaft disposed therein;

(d) an auxiliary rear wheel matching gear drive through which said gear drive rod extends; and (e) an auxiliary rear wheel drive gear, said auxiliary rear wheel drive gear engaging and being rotatable with said auxiliary rear wheel matching gear drive to impart rotational motion to said pair of rear auxiliary wheels.

15. The wheelchair in accordance with claim 14, wherein a rod collar is affixed to said gear driven rod in order to prevent said rod from moving and slipping.

* * * * *